US 7,363,345 B2

(12) United States Patent
Austin-Lane et al.

(10) Patent No.: US 7,363,345 B2
(45) Date of Patent: Apr. 22, 2008

(54) ELECTRONIC NOTIFICATION DELIVERY MECHANISM SELECTION BASED ON RECIPIENT PRESENCE INFORMATION AND NOTIFICATION CONTENT

(75) Inventors: Christopher Emery Austin-Lane, Takoma Park, MD (US); Thomas Louis Dellecave, Jr., Ashburn, VA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 0 days.

(21) Appl. No.: 10/320,712

(22) Filed: Dec. 17, 2002

(65) Prior Publication Data

US 2004/0044736 A1 Mar. 4, 2004

Related U.S. Application Data

(60) Provisional application No. 60/406,078, filed on Aug. 27, 2002.

(51) Int. Cl.
G06F 15/16 (2006.01)
G06F 15/173 (2006.01)

(52) U.S. Cl. ........................ 709/207; 709/224; 709/238

(58) Field of Classification Search ................ 709/206, 709/202, 219, 205, 204, 209, 318, 207, 224, 709/238; 370/338; 705/37
See application file for complete search history.

(56) References Cited

U.S. PATENT DOCUMENTS

| | | | |
|---|---|---|---|
| 5,646,982 A | 7/1997 | Hogan et al. | |
| 5,771,280 A * | 6/1998 | Johnson | ................... 379/93.23 |
| 5,933,477 A | 8/1999 | Wu | |
| 6,067,561 A | 5/2000 | Dillon | |
| 6,115,455 A | 9/2000 | Picard | |
| 6,175,859 B1 | 1/2001 | Mohler | |
| 6,208,996 B1 | 3/2001 | Ben-Shachar et al. | |
| 6,430,604 B1 | 8/2002 | Ogle et al. | |
| 6,460,073 B1 | 10/2002 | Asakura | |
| 6,567,807 B1 | 5/2003 | Robles et al. | |
| 6,584,494 B1 * | 6/2003 | Manabe et al. | ............. 709/204 |
| 6,618,747 B1 | 9/2003 | Flynn et al. | |
| 6,636,888 B1 | 10/2003 | Bookspan et al. | |
| 6,687,745 B1 * | 2/2004 | Franco et al. | ................ 709/219 |
| 6,697,824 B1 * | 2/2004 | Bowman-Amuah | ......... 709/229 |
| 6,721,784 B1 | 4/2004 | Leonard et al. | |
| 6,732,103 B1 | 5/2004 | Strick et al. | |
| 6,732,185 B1 | 5/2004 | Reistad | |
| 6,782,414 B1 | 8/2004 | Xue et al. | |

(Continued)

OTHER PUBLICATIONS

International Search Report, PCT/US03/26762, dated Apr. 16, 2004.

(Continued)

*Primary Examiner*—Paul H. Kang
(74) *Attorney, Agent, or Firm*—Fish & Richardson P.C.

(57) ABSTRACT

Delivering an electronic notification to an intended recipient may include communicating an electronic notification directed to an intended recipient, and determining presence information associated with the intended recipient before attempting to deliver the notification to the intended recipient. A cascaded delivery instruction also may be resolved based on notification information. The presence information and the cascaded delivery instruction may be used to select among several delivery mechanisms potentially available for the intended recipient based on the presence information, and to deliver the electronic notification to the intended recipient at the selected delivery mechanism. The presence information may include an online presence and/or a physical presence of the intended recipient.

61 Claims, 10 Drawing Sheets

U.S. PATENT DOCUMENTS

| | | | |
|---|---|---|---|
| 6,854,007 | B1 | 2/2005 | Hammond |
| 6,934,367 | B1 | 8/2005 | LaPierre et al. |
| 6,999,566 | B1 | 2/2006 | Eason et al. |
| 7,133,506 | B1 | 11/2006 | Smith |
| 2001/0016823 | A1 | 8/2001 | Richards et al. |
| 2002/0021307 | A1 | 2/2002 | Glenn et al. |
| 2002/0032742 | A1 | 3/2002 | Anderson |
| 2002/0120687 | A1* | 8/2002 | Diacakis et al. ............ 709/204 |
| 2002/0123328 | A1 | 9/2002 | Snip et al. |
| 2002/0151294 | A1 | 10/2002 | Kirby et al. |
| 2002/0160757 | A1 | 10/2002 | Shavit et al. |
| 2002/0160805 | A1 | 10/2002 | Laitinen et al. |
| 2002/0165729 | A1 | 11/2002 | Kuebert et al. |
| 2003/0018704 | A1* | 1/2003 | Polychronidis et al. ..... 709/202 |
| 2003/0023681 | A1* | 1/2003 | Brown et al. ............... 709/204 |
| 2003/0052915 | A1* | 3/2003 | Brown et al. ............... 345/752 |
| 2003/0055897 | A1* | 3/2003 | Brown et al. ............... 709/205 |
| 2003/0131143 | A1* | 7/2003 | Myers ........................ 709/318 |
| 2003/0158902 | A1* | 8/2003 | Volach ....................... 709/206 |
| 2003/0208547 | A1* | 11/2003 | Branimir ................... 709/206 |
| 2003/0227894 | A1* | 12/2003 | Wang et al. ................ 370/338 |
| 2003/0233416 | A1 | 12/2003 | Becker |
| 2004/0010808 | A1 | 1/2004 | deCarmo |
| 2004/0019645 | A1* | 1/2004 | Goodman et al. .......... 709/206 |
| 2004/0078440 | A1* | 4/2004 | Potter et al. ................ 709/206 |
| 2004/0203766 | A1 | 10/2004 | Jenniges et al. |

OTHER PUBLICATIONS

Microservices: CommWorks Find Me-Follow Me Application; Dec. 11, 2002; commworks.com; pp. 1-2.

Microservices: CommWorks Message Alert System;Dec. 11, 2002; commworks.com; pp. 1-3.

Microservices: CommWorks Message Delivery System;Dec. 11, 2002; commworks.com; pp. 1-2.

CommWorks 8250 Personal Communications Management System;Dec. 11, 2002; commworks.com; pp. 1-2.

CommWorks IP Messaging; Dec. 11, 2002; commworks.com; pp. 1-2.

WebleySystems; CommuniKate Unified Communications Features List; Dec. 11, 2002; webley.com; pp. 1-3.

Upoc Quick Tour; Nov. 6, 2002; upoc.com; pp. 1-9.

Upoc General Help; Nov. 6, 2002; upoc.com; pp. 1-2.

Upoc NYSale; Nov. 6, 2002; upoc.com; pp. 1-2.

Upoc Entertainment Picks; Nov. 6, 2002; upoc.com; pp. 1-3.

Upoc Frequently Asked Questions; Nov. 6, 2002; upoc.com; pp. 1-6.

Microsoft PressPass; Nov. 7, 2002; microsoft.com; pp. 1-9.

Adeptra, Features; Nov. 27, 2002; adeptra.com; pp. 1-2.

Solutions Smartdelivery; Nov. 6, 2002; centerpost.com; pp. 1-2.

.Net Alerts Overview; Nov. 7, 2002; microsoft.com; pp. 1-3.

Adeptra Services Overview; Nov. 7, 2002; adeptra.com; pp. 1-7.

Ipipi Frequently Asked Questions; Nov. 6, 2002; ipipi.com; pp. 1-2.

Ozmosys Enterprise; Nov. 7, 2002; ozmosys.com; pp. 1-3.

Teraitech; Nov. 7, 2002; teraitech.com; 1 page.

Global Solutions Directory; Nov. 7, 2002; software.ibm.com; pp. 1-5.

Convergys Interactive Alerts Reduce Customer Care Costs and Improve Customer Satisfaction; convergys.com pp. 1-2, Jan. 22, 2002.

Upside, About Our Product; upsideweb.com; pp. 1-5, Nov. 6, 2002.

* cited by examiner

500

- ❖ NOTIFICATIONS
  - ➢ Global Definitions
    - Delivery
      - online device
        - ◆ web browser [1 – if user is online] — 512
        - ◆ IM client [2 – if user is online] — 514
      - wireless [3 – if enabled by user] — 516
      - email
        - ◆ inbox [4] — 518
        - ◆ archive [NULL] — 520
    - Priority [not urgent] — 522
    - Quiet Time [9 p.m. to 8 a.m.] — 524
  - ➢ Class Definitions
    - Alerts [NULL] — 543
    - Reminders [NULL] — 546
  - ➢ Type Definitions
    - Auction Alert — 555
      - Trigger event: bid on item [NULL] exceeded — 557
      - Priority: [NULL] — 559
      - Delivery precedence: [NULL] — 561
      - Membership list: [NULL]
      - Instantiations
        - ◆ Auction alert #1 (instantiation definition)
          - ➢ Trigger event: bid on item ['57 Bel Air, auction ID 53ZX793] exceeded — 565
          - ➢ Priority: [NULL] — 567
          - ➢ Delivery precedence: [NULL] — 569
          - ➢ Membership list: [WillRobinson] — 571
    - Stock Alert . . . — 585
    - Birthday Reminder . . . — 590
    - Anniversary Reminder . . . — 595

510 groups the Global Definitions section; 540 groups Class Definitions; 550 groups Type Definitions; 563 groups the Auction alert #1 instantiation.

- MEMBER PROFILE (WillRobinson)
  - Global Preferences — 610
    - Delivery
      - wireless
        - [enabled device = mobile phone #1] — 616
    - Priority [NULL]
    - Quiet time [NULL]
  - Class Preferences — 640
    - Alerts [NULL]   — 643
    - Reminders [NULL] — 646
  - Type Preferences — 650
    - Auction Alert (type preferences) [NULL]   — 655
      - Auction alert #1 (instantiation preferences) — 660
        - delivery — 663
          - online device
            - web browser [1]
            - IM client [2]
          - wireless
            - mobile phone #1 [3]
            - mobile phone #2 [5]
            - PDA [4]
            - pager [6]
          - email
            - inbox [7]
            - archive [always]
        - priority [urgent]   — 666
        - quiet time [NULL]   — 669
      - ...
    - Stock Alert (type preferences) ...   — 670
      - Stock alert #1 ...
    - Birthday Reminder (type preferences) ...   — 675
      - Birthday reminder #1 ...
      - Birthday reminder #2 ...
    - Anniversary Reminder (type preferences) ...   — 680
      - Anniversary reminder #1...

FIG. 6

PDA or mobile phone

ELECTRONIC NOTIFICATION DELIVERY MECHANISM SELECTION BASED ON RECIPIENT PRESENCE INFORMATION AND NOTIFICATION CONTENT

This application claims the benefit of U.S. Provisional Application No. 60/406,078, filed Aug. 27, 2002.

TECHNICAL FIELD

This disclosure generally relates to systems and methods of delivering information to a delivery mechanism.

BACKGROUND

Online service providers regularly offer new services and upgrade existing services to enhance their users' online experience. Users have virtually on-demand access to news, weather, financial, sports, and entertainment services as well as the ability to transmit electronic messages and to participate in online discussion groups. For example, users of online service providers such as America Online® or CompuServe® may view and retrieve information on a wide variety of topics from servers located throughout the world.

Several software applications are made available by online service providers and application providers as delivery mechanisms to deliver electronic content and messages. These applications include electronic mail (email), instant messages, and public or private electronic bulletin boards. In addition, several other applications or devices may serve as delivery mechanisms, such as applications or devices using the short messaging service (SMS), the wireless application protocol (WAP), the transport connection protocol (TCP), the Internet protocol (IP), the World Wide Web, one or more local area networks, and/or one or more wide area networks. Delivery mechanisms also may include analog or digital wired and wireless telephone networks (e.g., public switched telephone networks (PSTN), integrated services digital networks (ISDN), various types of digital subscriber lines (xDSL), advance mobile telephone service (AMPS), global system for mobile communications (GSM), general packet radio service (GPRS), and code division multiple access (CDMA)), radio, cable, satellite, and/or other delivery mechanisms for carrying voice or non-voice data.

Furthermore, a variety of other devices or software applications may act as delivery mechanisms capable of rendering electronic communications to an intended recipient. The delivery mechanisms may include devices such as a telephone (either fixed or mobile), a pen-enabled computer, a personal digital assistant (PDA), a notebook computer, and/ or a desktop computer. The delivery mechanisms also may include software applications, such as, for example, a Web browser, an email client, an instant messaging (IM) client, a business productivity application (e.g., a word processor or, a spreadsheet program), and/or an operating system or operating system kernel residing on a device.

SUMMARY

In one general aspect, selecting a delivery mechanism to be used for delivering an electronic communication (e.g., a notification) includes determining actual availability of an intended recipient presently to receive the electronic communication using at least one candidate delivery mechanism before attempting to deliver the electronic communication using the candidate delivery mechanism. Selecting the delivery mechanism also includes deciding whether to send the electronic communication using the candidate delivery mechanism based on the determined actual availability. The delivery mechanism may be mobile or fixed, and also may be wired or wireless.

Implementations may include one or more of the following features. For example, determining the actual availability of the intended recipient may include determining an availability of the intended recipient based on an activity, behavior, physical presence, or online presence of the intended recipient.

A cascaded delivery instruction that is appropriate for the intended recipient may be resolved based on notification information. The notification information may include a preference of the intended recipient and/or a system definition. Where more than one candidate delivery mechanism potentially is available for the intended recipient, the cascaded delivery instruction may be resolved to include one or more of the available mechanisms and/or an associated delivery precedence.

The actual delivery mechanism may be selected from among more than one candidate delivery mechanism based on the actual availability of the intended recipient and/or on the cascaded delivery instruction. The actual delivery mechanism may be selected because it appears available to provide the electronic communication to the user without significant delay.

These general and specific aspects may be implemented using a method, a system, or a computer program, or any combination of systems, methods, and computer programs.

Other features will be apparent from the description, the drawings, and the claims.

DESCRIPTION OF DRAWINGS

FIGS. 4-6 illustrate an exemplary data structure that may be associated with electronic notifications deliverable by the system of FIG. 3.

Like reference symbols in the various drawings indicate like elements.

DETAILED DESCRIPTION

An electronic notification may be delivered to an intended recipient after determining presence information associated with the intended recipient. A cascaded delivery instruction also may be resolved based on notification information, such as a user preference or a system definition. The presence information is used to select among several delivery mechanisms potentially available to the intended recipient. The cascaded delivery instruction may be used additionally for this purpose. Delivery of the notification based on the presence information or cascaded delivery instruction enhances the likelihood that the electronic notification is received by the intended recipient without significant delay.

In one aspect, the presence information indicates an online presence of the intended recipient and an associated online delivery mechanism suitable to receive the electronic notification. In another aspect, the presence information indicates a physical presence of the intended recipient, which may be used to select a delivery mechanism within a predefined range of the intended recipient's physical presence.

Figure 1:
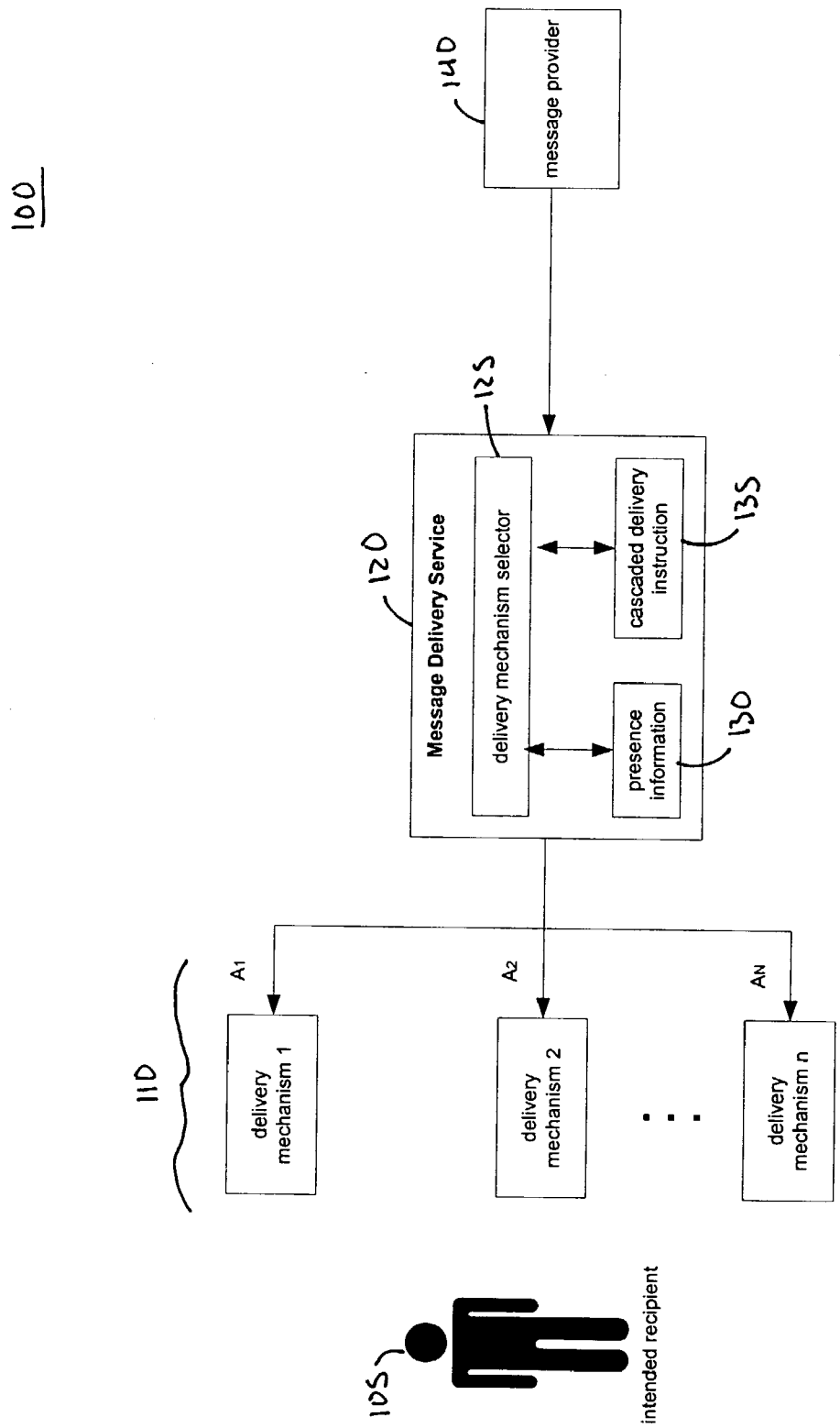
FIG. 1 is a is a schematic diagram of an electronic communication system.

FIG. 1 shows a generalized system 100 used to deliver an electronic message to an intended recipient 105 at one or more candidate delivery mechanisms 110 based on a presence of the intended recipient 105. The candidate delivery mechanisms 110 generally may include any device, system, and/or piece of code that relies on another service to perform an operation. The candidate delivery mechanisms 110 may include, for example, a fixed or mobile communication device, whether wired or wireless, and/or a software application, such as, for example, a messaging application or a browser. The candidate delivery mechanisms 110 also may include any protocols (i.e., standards, formats, conventions, rules, and structures) or delivery channels $A_1$-$A_N$ appropriate for corresponding devices or applications of the candidate delivery mechanisms 110. The protocols or delivery channels $A_1$-$A_N$ may include, for example, one or more other systems, such as for example, one or more wired networks and/or one or more wireless networks.

A message delivery service 120 communicates with a message provider 140 and obtains a message directed to the intended recipient 105. The message delivery service 120 includes a delivery mechanism selector 125, presence information 130, and a cascaded delivery instruction 135.

The delivery mechanism selector 125 may be configured to access or receive the presence information 130 and/or the cascaded delivery instruction 135, and to determine one or more preferred delivery options based on this and/or other information. That is, in general, the message delivery service 120 uses the delivery mechanism selector 125 to select from among the candidate delivery mechanisms 110 an actual delivery mechanism that is expected to provide the message to the intended recipient 105 without significant delay.

The delivery mechanism selector 125 selects the actual delivery mechanism based on presence information 130 and/or the cascaded delivery instruction 135. The presence information 130 may indicate an actual presence of the intended recipient 105. The presence information 130 may be based on actual activity, behavior, or physical presence of the intended recipient 105. The cascaded delivery instruction 135 may include, for example, a delivery precedence, a hierarchical delivery rule, or any other logical rule or definition that may be used to control delivery of the message.

The message provider 140 typically may include any source of an electronic message or information. The message provider 140 may employ one or more protocols to transfer information internally or to deliver information to the message delivery service 120.

Both the message delivery service 120 and the message provider 140 may further include various mechanisms for delivering voice and/or non-voice data. The various mechanism may include, for example, any applications, protocols, devices, or networks used to facilitate communication of electronic data. Both the message delivery service 120 and the message provider 140 also may include or be included in a general-purpose or a special-purpose computer, at least one local area network, and/or at least one wide area network. The response to and execution of instructions received by the message delivery service 120, the message provider 140, or any of their components (collectively the system services), may be controlled by, for example, a program, a piece of code, an instruction, a device, a computer system, or a combination thereof, for independently or collectively instructing the system services to interact and operate as described herein.

Figure 2:
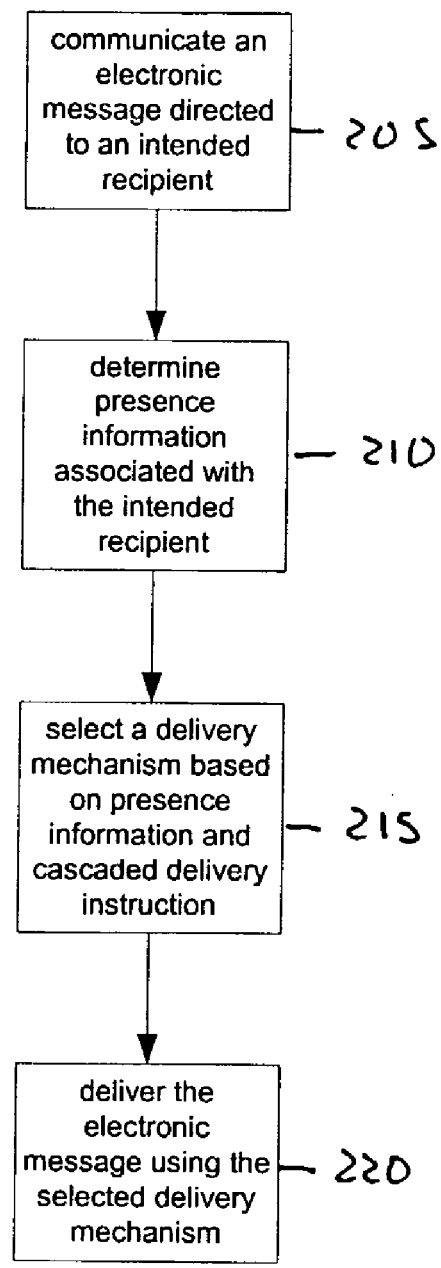
FIG. 2 is a flow diagram of a process implementable by the electronic communication system of FIG. 1.

FIG. 2 illustrates a flow diagram of a process 200 implementable by, e.g., the system 100 of FIG. 1 to deliver a message to a user based on at least presence information 130. The message provider 140 communicates to the message delivery service 120 an electronic message directed to the intended recipient 105 (step 205). The message provider 140 may communicate the message to the message delivery service 120 in response to activity of the message delivery service 120, of another system or service, or of the message provider 140. The message delivery service 120 may determine presence information 130 associated with the intended recipient 105 before delivering the message to the intended recipient 105 (step 210). For example, the message delivery service 120 may determine an actual presence of the intended recipient 105 (e.g., an online presence, or a physical presence). The message delivery service 120 employs the delivery mechanism selector 125 to select an actual delivery mechanism from among the candidate delivery mechanisms 110 based on the presence information 130 and the cascaded delivery instruction 135 (step 215). The message delivery service 130 then delivers the electronic message to the intended recipient 105 using the actual delivery mechanism (step 220).

Figure 3:
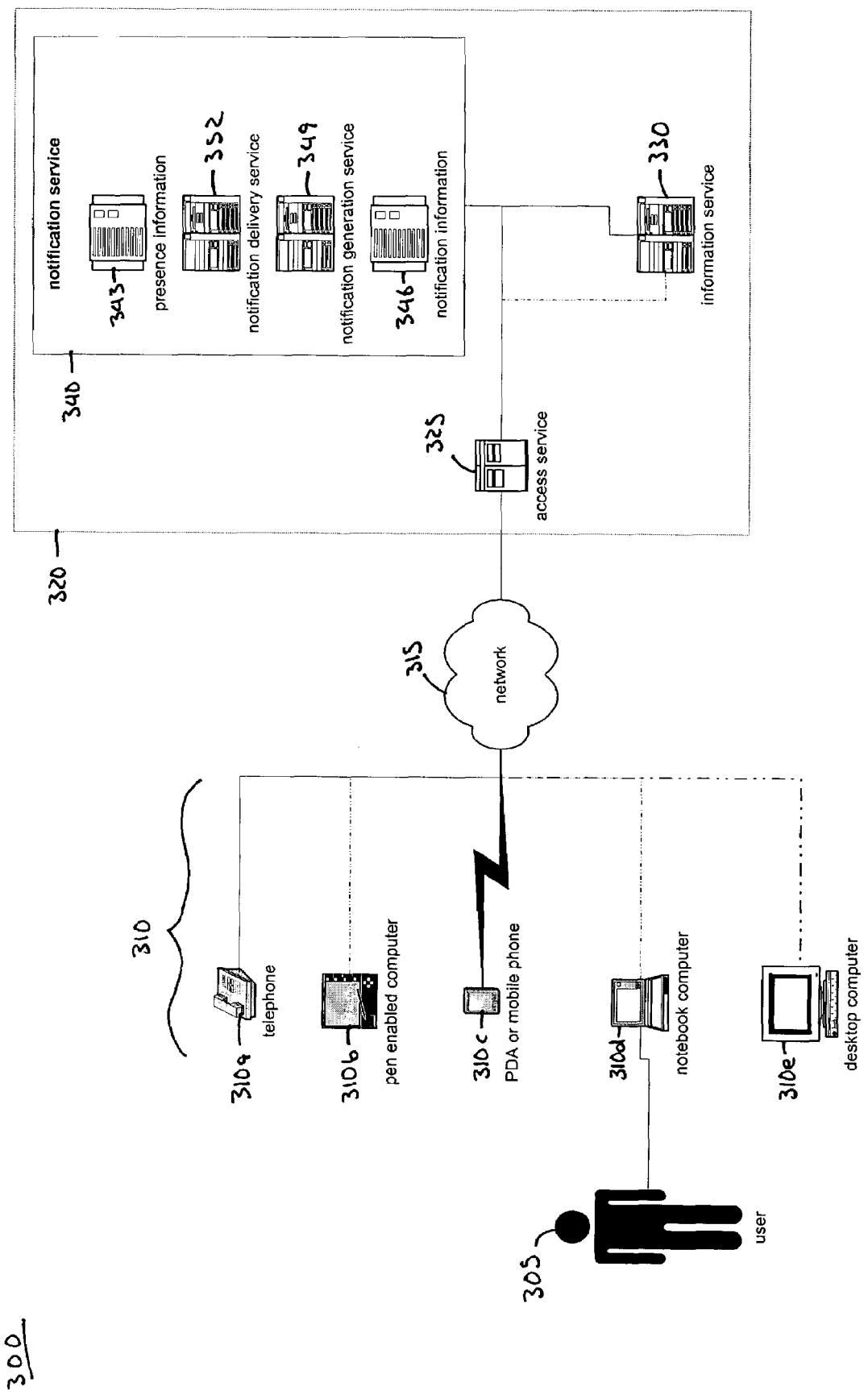
FIG. 3 is a schematic diagram of an electronic notification delivery system.

Referring to FIG. 3, a generalized notification system 300 notifies a user 305 of information or an event by providing an electronic notification (notification) to one or more delivery mechanisms 310 associated with the user 305 based on a presence of the user (e.g., an online presence, a physical presence). The notification system 300 provides the notification to the delivery mechanisms 310 using a network 315 and an online service 320. Exemplary components of the notification system 300 are described in greater detail below.

The delivery mechanisms 310 generally are analogous to the candidate delivery mechanisms 110 of FIG. 1. Each delivery mechanism 310 may include any device, system, and/or piece of code that relies on another service to perform an operation. For example, a delivery mechanism 310 may include a device such as a telephone 310a, a pen-enabled computer 310b, a personal digital assistant (PDA) or mobile telephone 310c, a notebook computer 310d, and/or a desktop computer 310e. The delivery mechanisms 310 also may include, for example, a Web browser, an email client, a synchronization client (e.g., a calendar synchronization client, or a task list synchronization client), an instant messaging (IM) client, a business productivity application (e.g., a word processor, or a spreadsheet program), and/or an operating system or operating system kernel residing on a device. The delivery mechanisms 310 may be arranged to operate within or in concert with one or more other systems, such as, for example, one or more LANs (local area networks) and/or one or more WANs (wide area networks).

Each of the delivery mechanisms 310 may be accessible to the online service 320, and the user 305 may access the online service 320 using one or more of the delivery mechanisms 310. For example, the user 305 may use the notebook computer 310d to access the online service 320.

A delivery mechanism 310 may receive a notification and format the notification using a standard protocol, such as, for example, the standard generalized markup language (SGML), the extensible markup language (XML), the hypertext markup language (HTML), the extensible hypertext markup language (XHTML), the compact hypertext markup language (cHTML), the virtual reality markup language (VRML), the wireless markup language (WML), the voice extensible markup language (VXML), a document object model (DOM), or the dynamic hypertext markup language (DHTML). The formatted notification may permit the user 305 to respond to the notification.

The online service 320 generally may include, for example, any device, system, and/or piece of code configured to perform an operation requested by one or more of the delivery mechanisms 310 (e.g., the PDA or mobile telephone 310c, a Web browser, the workstation 310e, or another service). The online service 320 may include an access service 325. The access service 325 may control access to the online service 320 using, for example, authorization and/or authentication methods, and may transform messages received from the network 310 into a communication protocol of the online service 320 (e.g., asynchronous transfer mode (ATM) or fiber distributed data interface (FDDI)), or vice versa.

The online service 320 includes an information service 330. The information service 330 typically includes different services and sources of information, such as, for example, third party information or services, email, a discussion group, a chat room, a news service, a broker service, a banking service, a shopping service, a weather service, the World Wide Web, or Internet access. The information service 330 may employ one or more protocols (i.e., standards, formats, conventions, rules, and structures) to transfer information internally or deliver information to a user. Protocols employed by the information service 330 may include, the Internet protocol (IP), the transfer connection protocol (TCP), the hypertext transfer protocol (HTTP), the file transfer protocol (FTP), the user datagram protocol (UDP), the layer two tunneling protocol (L2TP) and/or the simple mail transfer protocol (SMTP).

The online service 320 also includes a notification service 340 to provide a notification to the user 305 based on information of the information service 330. In general, the notification service 340 includes presence information 343 (generally analogous to the presence information 130 of FIG. 1) and notification information 346. Both the presence information 343 and the notification information 346 may be determined based on information of the notification service 340, information of the information service 330, and/or information of other online services. The presence information 343 may be based on actual activity, behavior, or physical presence of the user 305, rather than upon information inferred from the user preferences or system definitions of the notification information 346.

The presence information 343 may include, for example, information indicating an online presence of the user 305 based on information of the information service 330 (e.g., information indication that the user 305 is browsing the web, the user 305 has an active instant messaging session, the user 305 is online using a television, the user 305 is online using a game console, the user 305 is online using a networked radio, or the user 305 currently is active in a chat room discussion). The presence information 343 also may include information indicating a physical presence of the user. The physical presence information may be determined, for example, from a global positioning system associated with the user 305.

The notification information 346 may include user preferences and system definitions. For example, the notification information 346 may include a delivery preference of the user 305 determined based on information provided by the user 305 to the notification service 340. On the other hand, the system definitions may be generated by the system or by an administrator of the system. The system definitions may include, for example, definitions of classes of notifications, and/or definitions of each available notification. The definition of each notification includes one or more conditions to be satisfied before the notification may be delivered. When those conditions are satisfied, the notification is considered to be triggered, and the event or information that satisfied the conditions is known as the triggering event (or triggering information). For simplicity, the conditions that the triggering event satisfies may themselves be referred to as the triggering event.

Numerous examples of triggering events exist, but, for brevity, only a few of those examples are described here. Triggering events may be based, for example, on a promotional advertisement, an account balance, a portfolio status, a credit status, an online status, information that an order and/or a service is complete, or a message regarding confirmation, cancellation, and/or rescheduling of an appointment. Other examples include, but are not limited to, a weather forecast and/or adverse weather conditions of a particular geographic region; a particular date, holiday and/or other special occasion; an online status of another user; a change to a predetermined web page; or entertainment programming and/or ticket information.

The notification information also may include a record of users registered to receive notifications, and a record of the notifications (active notifications) that the users have registered to receive. Upon registration to receive a notification, a user may inform the notification service 340 of notification preferences regarding that notification. The notification service 340 may include those notification preferences in the notification information.

For example, the user 305 may access the notification service 340 to register for a stock alert and a birthday reminder. The notification service 340 may record that the user 305 has registered for the stock alert and the birthday reminder. At registration, the user 305 may provide the notification service 340 with notification preferences. In general, the notification preferences may include triggering information, a timing of the notification, a notification delivery preference, and/or a presentation method of the notification. A variety of delivery and/or presentation methods may be available for the user 305 to select from. For example, the user 305 may select to receive the notification as an instant message, an icon, a pop-up window, a video, a flashing indicator, and/or an audio, or tactile alarm. The notification may be delivered to the user 305 while the user 305 is online, for example, or may be delivered to a wireless device (e.g., a mobile phone, a PDA, or a pager), a standard telephone, voicemail, and/or email if the user 305 so desires. In this manner, the user may arrange to be notified at a delivery mechanism that the user anticipates will most likely provide the notification to the user without significant delay.

Referring back to the notifications selected by the user 305, the user 305 may determine to receive the stock alert when a specified stock exceeds a 52-week high, and to receive the alert immediately at a mobile phone retained by the user 305 at all times. As another example, the user 305 may determine to receive the birthday reminder one week prior to the specified birthday, and again the day before, and to be reminded through a non-intrusive email.

The notification service 330 includes a notification generation service 349 that generates notifications based on the information of the information service 330, and a notification delivery service 352 that delivers the notifications to the user 305 using one or more of the delivery mechanisms 310. The notification service 340 also may include a print service, a file access service, an IM service, an operating system, an operating system kernel, an authentication service, an authorization service, and/or any combination of these or other services.

In general, the notification generation service 349 generates notifications based on the notification information maintained by the notification service 340. The notification generation service 349 communicates with the information service 330 (e.g., by polling the information service 330, or by receiving updates from the information service 330 periodically or upon a triggering event) to identify when a notification trigger is satisfied, for example, by the occurrence of a particular event, or by the presence of predetermined information. Alternatively, the information service 330 itself may note the triggering event and notify the notification generation service 349. In either event, the notification generation service 349 generates and communicates a corresponding notification to the notification delivery service 352 for delivery.

Typically, the notification generation service 349 will include a software program or piece of code to control reception and/or retrieval of information from the information service 330. The notification generation service 349 may receive the information from the information service 330, and may then determine whether the information corresponds to a triggering event of a notification of interest to the user 305.

Alternatively, or in addition, a notification may be generated by the information service 330 (e.g., by a third party service that provides a certain category of services such as stocks, news, or weather). Content for the notification may be provided by the notification generation service 349, the information service 330, or by any other third party, including the user 305. In one implementation, the notification service 340 queries user 305 as to whether the user 305 would like to receive various categories of third party notifications. For example, the notification service 340 may communicate with third party suppliers of computer merchandise and may query the user 305 as to whether the user 305 would like to receive notifications from any or all third parties that supply computer merchandise. In another implementation, the user 305 may register for a notification at a web site of a third party. Once the user 305 has registered to receive the notification, the third party may directly or indirectly generate the notification.

The notification delivery service 352 may be configured to receive the notification from the notification generation service 349 and to deliver the notification to the user 305. The notification delivery service, alone or in conjunction with other services, may perform sorting, prioritizing, or other types of organizational processing on the notification so that the notification is delivered to an optimal delivery mechanism in a desired fashion.

More particularly, the notification delivery service 352 may deliver the notification to the user based on the presence information 343 and/or the notification information 346. In this manner, the notification delivery service 352 may deliver the notification to one of the delivery mechanisms 310 of the user 305 that is expected to provide the electronic notification to the user 305 without significant delay. For example, the presence information 343 may indicate that the user 305 presently is online using notebook computer 310d to browse the Web, and that the user 305 has an active IM connection. The notification information 346 may indicate that the user 305 prefers to receive notifications through instant messaging rather than the Web browser. Based on the presence information 343 and the notification information 346, the notification delivery service 352 may provide the notification to the user 305 using an instant message to the notebook computer 310d.

The network 315 typically allows direct or indirect communication between the delivery mechanism 310 and the online service 320, irrespective of physical or logical separation. Examples of a network 315 include the Internet, the World Wide Web, WANs, LANs, analog or digital wired and wireless telephone networks (e.g. PSTN, ISDN, or xDSL), radio, television, cable, satellite, and/or any other delivery mechanism for carrying data. The network 315 may be secured or unsecured.

Each of the delivery mechanism 310, the network 315, and the online service 320 may further include various mechanisms for delivering voice and/or non-voice data, such as, for example, the short message service (SMS), the wireless application protocol (WAP), the transport connection protocol (TCP), the Internet protocol (IP), the World Wide Web, one or more local area networks, and/or one or more wide area networks. The delivery mechanism 310, the network 315, and the online service 320 also may include analog or digital wired and wireless telephone networks, e.g., public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), radio, cable, satellite, and/or other delivery mechanisms for carrying voice or non-voice data.

One or more other services may be included in the components of notification delivery system 300 and/or these components (hereinafter the system services) may be included as part of one or more other services. For example, the system services may include or be included in a general-purpose or a special-purpose computer (e.g., a personal computer, a PDA, or a device specifically programmed to perform certain tasks), at least one local area network, and/or at least one wide area network. In either case, the response to and execution of instructions received by any or all of the system services may be controlled by, for example, a program, a piece of code, an instruction, a device, a computer system, or a combination thereof, for independently or collectively instructing the services to interact and operate as described herein.

Figure 4:
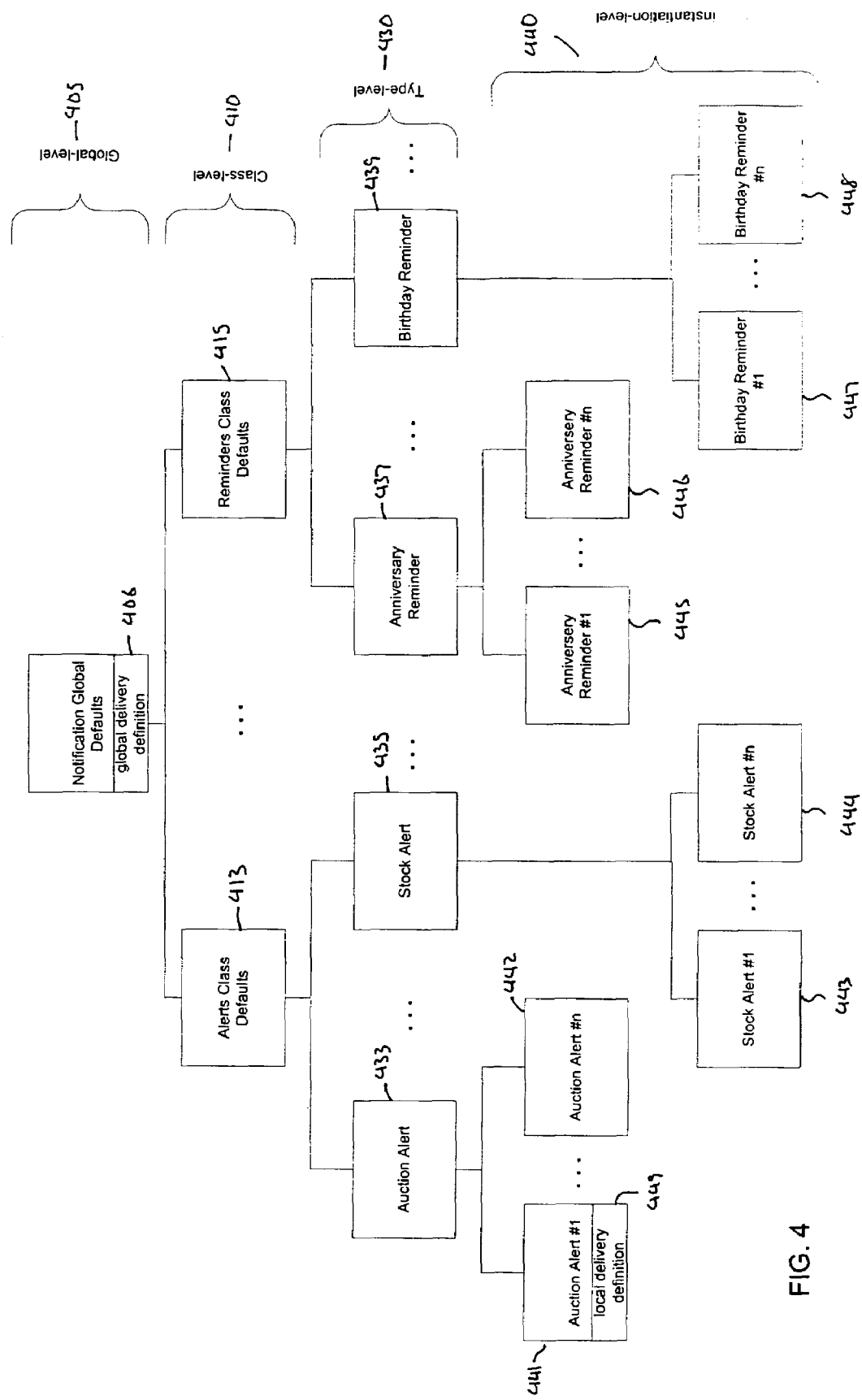

FIG. 4. illustrates a notification data structure 400 that may be used by the notification service 320 of FIG. 3 to maintain the notification information 346. The notification data structure 400 may be structured as a hierarchical tree and may provide a logical representation of the notification information 346. For example, a highest hierarchical level of the notification data structure 400 may include a notification global-level defaults node 405 representative of a generalized notification. A lower class-level 410 of the notification data structure 400 may further define notifications according to notification classes. For example, the notifications may include a class of notifications that are event-based alerts 413, and a class of notifications that are date-based reminders 415. Other notification classes are possible, such as, for example, a class for notifications allowing public membership, a class for notifications with private membership, and a class based on a quality of one or more targeted recipient.

The notification data structure 400 includes a type-level 430 that further defines the notifications according to notification type. The alerts class 413 may include, for example, an auction alert type 433, and a stock alert type 435, an anniversary reminder type 437, and a birthday reminder type 439, among others. Still further, the notification data structure 400 includes an instantiation-level 440 to identify and define activated instantiations of the notification type. Each notification type (e.g., the auction alert type 433) may include active instantiations of that notification. For example, the auction alert type may include instantiations of that alert activated by user registration (e.g., auction alert #1 441 through auction alert #n 442). Other instantiations include stock alert #1 443 through stock alert #n 444, anniversary reminder #1 445 through anniversary reminder #n 446, and birthday reminder #1 447 through birthday reminder #n 448.

Each level of the notification data structure 400 may include both system definition information and user preference information for the notification information 346. For example, the notifications global-level 405 may include system-defined delivery information, and also user-defined delivery information. To the extent that there is contradiction, the user preference information may preempt the system definition information for a given hierarchical level of the notification data structure 400. Moreover, each node of the notification data structure 400 may be configured to inherit notification information 346 from a node of a higher hierarchical level from which the node depends. Stated differently, notification information 346 may pass from a higher hierarchical level of the notification data structure 400 to a lower level to provide information missing at the lower level.

For example, the notifications global node 405 may include a global delivery definition 406. Lacking its own delivery definition, the alerts class defaults 413 may inherit the global delivery definition 406 from the notification global defaults 405. The auction alert type 433 also may fail to define a delivery definition. Therefore, the auction alert type 433 may inherit the global delivery definition 406 from the alerts class 413. However, auction alert #1 441, an instantiation of the auction alert type 433, may include a local delivery definition 449. To the extent that the local delivery definition 449 is complete, it overrides the global delivery definition 406 that it would inherit otherwise. On the other hand, auction alert #n 442, a further instantiation of the auction alert type 433, does not include a delivery definition and inherits the global delivery definition 406 from the auction alert type 433.

FIGS. 5 and 6 illustrate an implementation of the notification data structure 400 that includes data structures that are similar to and parallel each other for structuring the system definition information and the user preference information, respectively.

Referring to FIG. 5, the notification data structure 400 may include system definitions 500. The system definitions 500 include global definitions 510, class definitions 540, and type definitions 550. The global definitions, for example, define a global delivery precedence that controls whether and/or when the notification delivery service 352 delivers a notification to a particular delivery mechanism. More specifically, the global definitions 510 instruct the notification delivery service 352 to select the following delivery mechanisms as delivery recipients in the order of preference shown: (1) a web browser 512, if the user is online, (2) an IM client 514, if the user is online, (3) a wireless client 516, if wireless delivery is enabled for the user, and (4) an email inbox 518. Lastly, an email archive 520 is provided for, but is not activated as a delivery option in this configuration. The global definitions also define notification priority 522 to be "not urgent," and that a "quiet time" 524 applies between 9:00 PM and 8:00 AM during which only urgent notifications are delivered to attract the immediate attention of the user 305.

The system definitions 500 also include class definitions for an alert class 543 of notifications and for a reminders class 546 of notifications. In this example, neither the alert class 543 nor the reminders class 546 include any system definition information.

Additionally, the system definitions 500 include type definitions 550 that define, for example, an auction alert type 555, a stock alert type 585, a birthday reminder type 590, and an anniversary reminder alert 595. For brevity, only the auction alert type 555 is described as the other alert types are similar in relevant aspects. The auction alert type 555 defines, for example, a trigger event 557 on which the auction alert type is triggered. In this case, the trigger event is the occurrence of a bid on an item that exceeds a prior bid of the user 305 for the item. Although it does not do so here, the auction alert type may define an auction alert priority 559 and a delivery precedence 561.

One or more active instantiations may be associated with each notification type. The active instantiations may include corresponding system definition information. For example, auction alert #1 563 is one instantiation of the auction alert type 555. Auction alert #1 563 includes system definition information that further defines the trigger event of the alert. More specifically, the trigger event information 565 indicates that the bid item of interest is a 1957 Chevy Bel Aire with an auction identification of 53ZX793. The auction alert #1 563 also defines the priority 567 of the alert and the delivery precedence 569, although those definitions are left null valued in this example. Additionally, the auction alert #1 563 defines a membership list 571 of users registered to receive the notification. The identification may include, for example, a name of the user, an identification of the user, a login, a password, and/or a screen name. In the example shown, the user is identified by the screen name WillRobinson. Based on the screen name of the user WillRobinson, the notification service may access stored user preferences of WillRobinson.

Referring to FIG. 6, the notification data structure 400 also may include a user profile with user preferences 600. Similar to the system definitions 500, the user preferences 600 include global preferences 610, class preferences 640, and type preferences 650. In the illustration of FIG. 6, all of the global preferences are null valued except for wireless delivery preference 616. That preference indicates that mobile phone #1 is enabled generally to receive notifications for WillRobinson. To enable mobile phone #1 to receive notifications, WillRobinson may identify mobile phone #1 as a preferred delivery mechanism and may identify contact information related to mobile phone #1, such as, for example, an associated phone number. Although mobile phone #1 is enabled, no associated delivery precedence is provided.

Class preferences 640 also are provided for both the alerts class 643 and the reminders class 646. Those preferences, however, are null valued in this illustration.

The type preferences 650 may include preferences for various notification types for which WillRobinson has registered, such as, for example, the auction alert type 655, the stock alert type 670, the birthday reminder type 675, and/or the anniversary reminder type 680. For brevity, FIG. 6 provides detail only for the auction alert type 655. The auction alert type 655 includes type-level preferences and a single auction alert instantiation (i.e., auction alert #1 660) having associated instantiation preferences. The type preferences for the auction alert type 655 are null valued. Nevertheless, auction alert #1 660 defines the following delivery precedence 663: (1) a web browser (if the user is online), (2) an IM client (if the user is online), (3) a mobile phone #1, (4) a PDA, (5) a mobile phone #2, (6) a pager, and (7an email inbox. Lastly, an email archive is identified to always receive notification. The auction alert #1 660 also defines the notification priority 666 as "urgent," while leaving "quiet time" 669 undefined as a null value.

Figure 7:
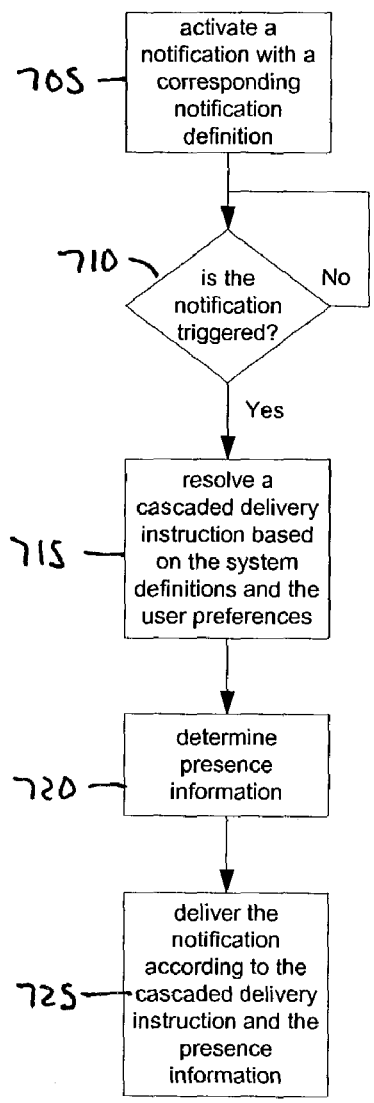
FIGS. 7-9 are flow diagrams illustrating an exemplary process implementable by the notification delivery system of FIG. 3.

FIG. 7 illustrates a flow diagram of a process 700 implementable by, e.g., the system of FIG. 3 to deliver a notification to a user based on presence information 343 and notification information 346. As previously described, the notification information 346 may include system definitions and user preferences associated with the notification. Initially, the user 305 may access the notification service 340 to activate a notification (step 705). For example, the user 305 may subscribe to an existing notification such as the auction alert described previously. Subscription to the auction alert creates an active instantiation of that alert (e.g., auction alert #1) associated with the user 305.

Based on the notification information 346, including the trigger event for the notification, the notification generation service 349 may determine whether information of the information service 330 triggers the notification (step 710). For example, the notification generation service 349 may poll the information service 330 to detect the occurrence or nonoccurrence of the trigger event. Insofar as the trigger event is not detected, the notification generation service 349 may continue to monitor for occurrence of the trigger event.

In another aspect of step 710, the notification generation service 349 may inform the information service 330 of the trigger event, or the information service 330 itself may determine the trigger event. In either event, the information service 330 may monitor its information for occurrence of the trigger event. When the information service 330 detects that the trigger event has occurred, the information service 330 may notify the notification generation service 349 of that occurrence. For example, the information service 330 may include an online auction (e.g., eBay) that may monitor auction activity for a trigger event selected by an auction participant. When that event is detected, the online auction may inform the notification generation service 349.

After the notification has been triggered (step 710), the notification delivery service 352 resolves a cascaded delivery instruction associated with the notification (step 715). The cascaded delivery instruction is resolved based on the notification information 346, including the system definitions and/or user preferences associated with the notification (step 715).

Before attempting to deliver the electronic notification, the notification delivery service 352 determines presence information 343 associated with the user 305 (step 720). The presence information may be based on actual activity, behavior, or physical presence of the user 305 rather than upon information inferred from the user preferences or system definitions of the notification information 346. For example, the notification delivery service 352 may determine information indicating an online presence of the user 305 based on information of the information service 330 (e.g., information indication that the user 305 is browsing the web, the user 305 has an active instant messaging session, the user 305 is online using a television, the user 305 is online using a game console, the user 305 is online using a networked radio, or the user 305 currently is active in a chat room discussion). The notification delivery service 352 also may determine presence information 343 indicating a physical presence of the user 305 (e.g., by communicating with a global positioning system associated with the user 305).

After determining the presence information 343, the notification delivery service 352 delivers the notification based on the presence information 343 and the previously resolved cascaded delivery instruction (step 725).

Figure 8:
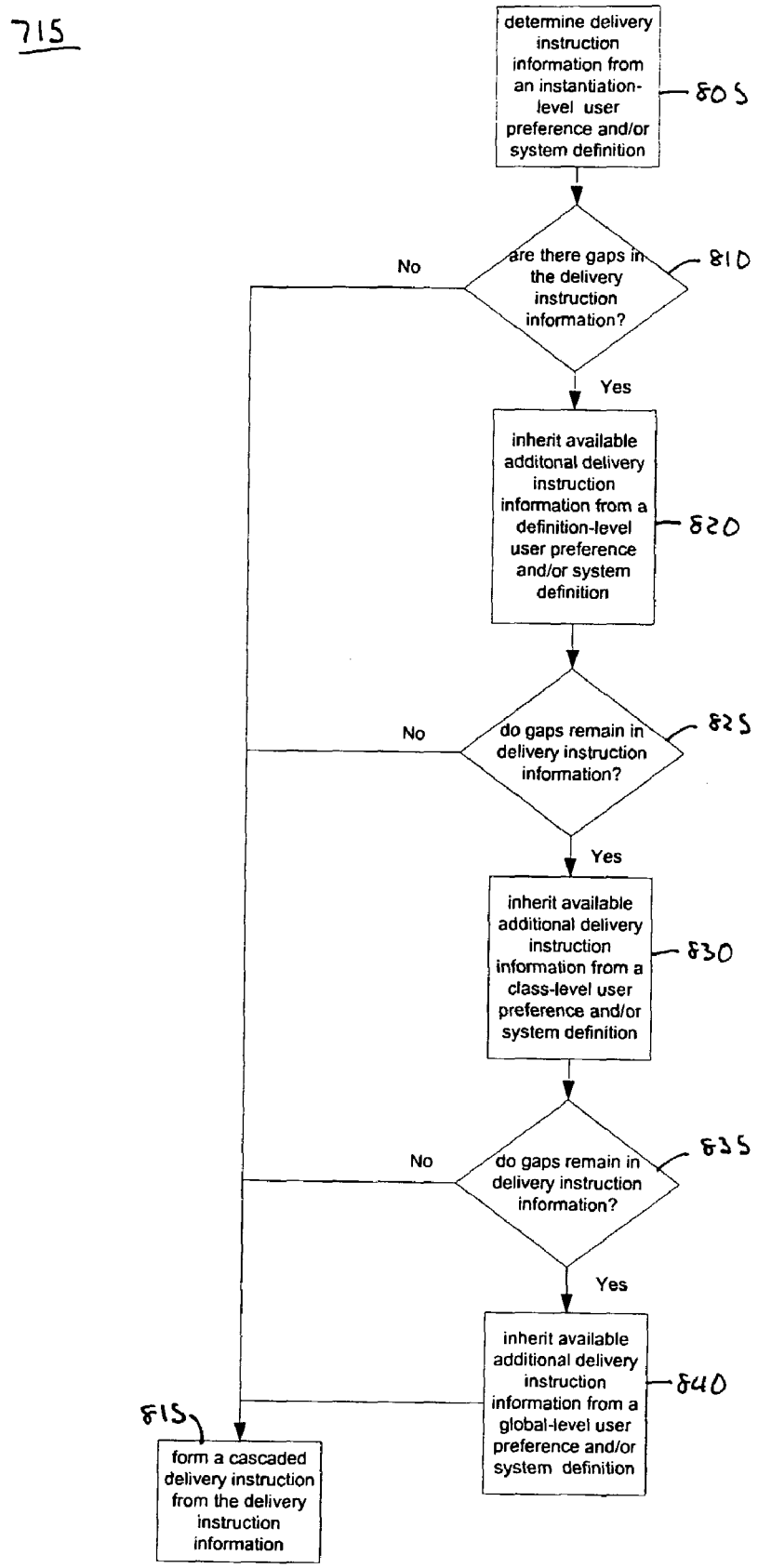

Referring to FIG. 8, a cascaded delivery instruction may be resolved (step 715) by determining delivery instruction information from an instantiation-level user preference and/or system definition (step 805). If no gaps are identified in the delivery instruction information (step 810), the cascaded delivery instruction may be formed based on the delivery instruction information (step 815). Otherwise, if gaps are identified (step 810), additional delivery instruction information may be inherited from a type-level user preference and/or system definition (step 820).

The supplemented delivery instruction information again may be evaluated for completeness (step 825). If the supplemented delivery instruction information is complete, the notification delivery service 352 may form the cascaded delivery instruction based on that information (step 815). Otherwise, if gaps remain in the delivery instruction information, that information may inherit additional delivery instruction information from a class-level user preference and/or system definition (step 830).

The process of evaluating the completeness of the supplemented delivery instruction information may be repeated again (step 835). As before, the notification delivery service 352 may form a cascaded delivery instruction from the supplemented delivery information where that information is complete (step 815). Otherwise, the notification delivery service 352 may form the cascaded delivery instruction (step 815) after the delivery instruction information is further supplemented through inheritance based on a global-level user preference and/or system definition (step 840).

The process of FIG. 8 may be used to resolve a cascaded delivery instruction for auction alert #1 described with respect to the system definitions 500 and the user preferences 600 of FIGS. 5 and 6, respectively. Initially, delivery instruction information is determined from the instantiation-level user preferences 660 of auction alert #1 (step 805). That information defines a delivery precedence 663 described previously: (1) a web browser (if the user is online), (2) an IM client (if the user is online), (3) a mobile phone #1, (4) a PDA, (5) a mobile phone #2, (6) a pager, and (7) an email inbox. In addition; an email archive is identified to always receive notification. The user preference information 660 of auction alert #1 also defines a notification priority 666 as "urgent," but leaves "quiet time" 669 undefined. Moreover, the delivery precedence 663 described above is open-ended. That delivery precedence would not be contradicted by adding, for example, an additional delivery mechanism to assume an eighth place role in the delivery precedence. In sum, a gap exists in the delivery instruction information (step 810).

The gap in the delivery instruction information is not filled by any information provided by the instantiation-level system definitions 563 or by any class-level system definitions 540 or user preferences 640 (steps 820-835). Likewise, the global-level user preferences 610 do not provide a "quiet time" definition. The global-level user preferences 610 do include some delivery information 616. That information, however, is not additional to delivery precedence information already determined. More specifically, that information simply notes that mobile phone #1 is enabled to receive a wireless notification, information already included in the instantiation-level preference information 663 that provides additionally that mobile phone #1 ranks number three in the delivery precedence.

However, the global-level system definitions 510 define "quiet time" 524 as between 9:00 PM and 8:00 AM, information additional to that already obtained. This additional delivery instruction information is inherited to fill the prior information gap (step 840). Note also that the global-level system definitions 510 provide delivery precedence information 512-520 and priority information 522 that is inconsistent with the aggregated delivery instruction information—and, therefore, is not inherited.

Having determined the relevant delivery instruction information, the notification delivery service 352 then forms a cascaded delivery instruction based on that information (step 815). The cascaded delivery instruction may be formed, for example, by converting the relevant delivery instruction information into a format or protocol required for delivery. The cascaded delivery instruction may remain substantively similar to the relevant delivery instruction information. In this example, the cascaded delivery instruction may provide that the notification is "urgent," that a "quiet time" from between 9:00 PM and 8:00 AM applies, and that the notification should be delivered according to the following delivery precedence: attempt delivery first to a web browser (if the user is online); second, to an IM client (if the user is online); third, to a mobile phone #1; fourth, to a PDA; fifth, to a mobile phone #2; sixth, to a pager; and seventh, to an email inbox. Lastly, all notifications also are to be delivered to an email archive.

Figure 9:
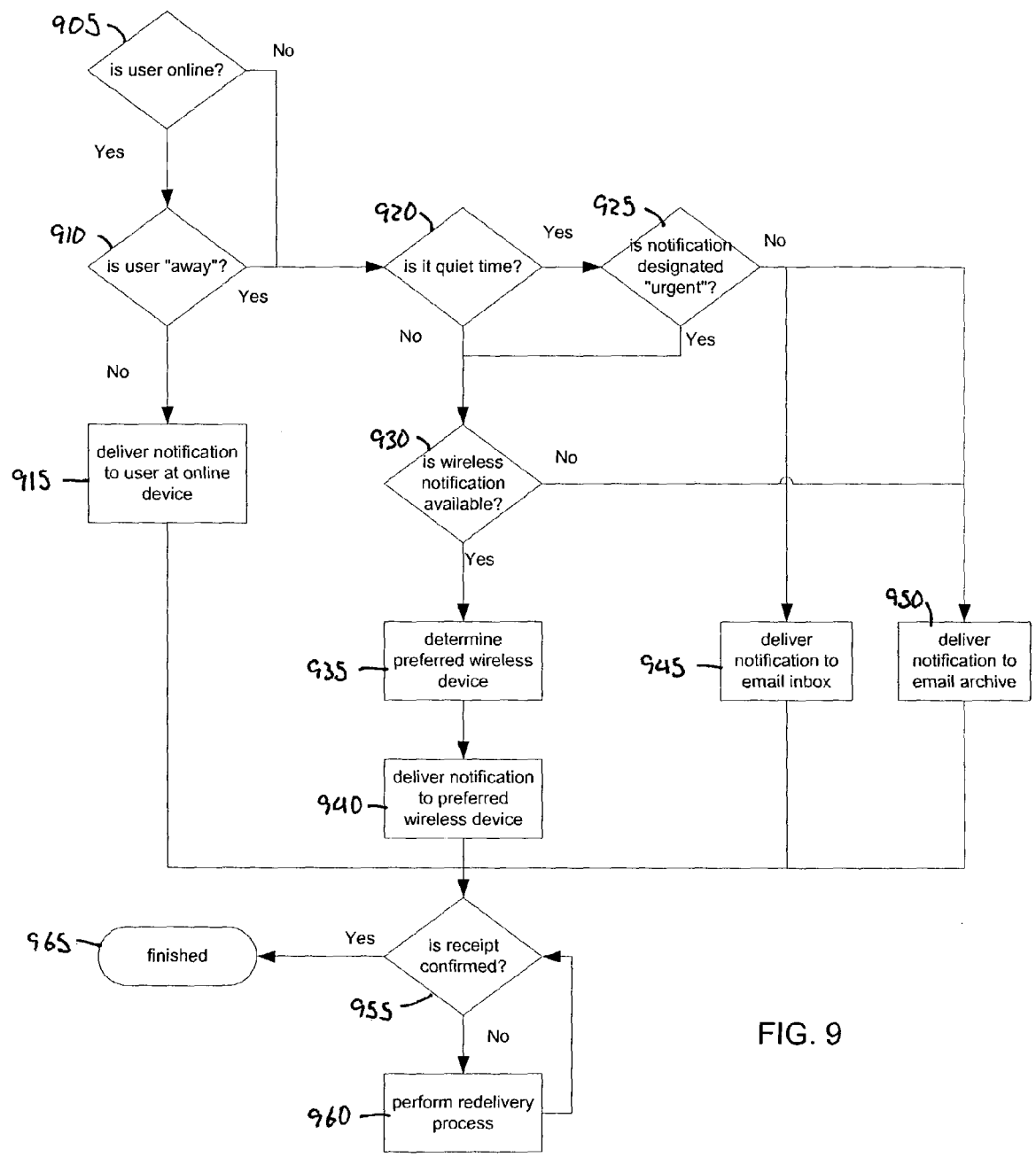

Referring to FIG. 9, delivering the notification according to the cascaded delivery instruction may include determining whether the user 305 to whom the notification is directed is online (step 905). If the user 305 is online, the notification delivery service 352 may further determine whether the user 305 has marked himself as "away" from the online delivery mechanism (step 910). If the notification delivery service 352 determines that the user 305 is online and is not away from the online delivery mechanism, the notification delivery service 352 may deliver the notification to that online delivery mechanism (step 915).

If the notification delivery service 352 determines, however, that the user 305 is not online (step 905), or is away from the online delivery mechanism (step 910), then the notification delivery service 352 may determine whether it currently is "quiet time" for the user 305 (step 920). The notification delivery service 352 also may determine whether the notification is designated as "urgent" (e.g., a notification might be marked "urgent" that alerts of a tornado that has been spotted near the user's home address) (step 925). Where the notification delivery service 352 determines that it is not "quiet time" or that the notification is "urgent" (i.e., "urgency" overrides "quiet time"), the notification delivery service 352 may determine whether wireless notification is available for the user 305 (e.g., through notification to a mobile phone, a PDA, a pager) (step 930). If wireless notification is available, the notification delivery service 352 may determine a wireless delivery mechanism at which the user 305 prefers to receive the notification (step 935) and may deliver the notification to that wireless device (step 940).

However, should the notification delivery service 352 determine that it is "quiet time" (step 920) and that the notification is not "urgent" (step 925), the notification delivery service 352 may deliver the notification to an email inbox (step 945) and/or to an email archive (step 950).

In whatever manner the notification is delivered, the notification delivery service 352 may require that the delivery mechanism confirm receipt of the notification or that the user has received the notification (step 955). For example, the delivery mechanism may provide an acknowledgement to the notification delivery service at the time at which the delivery mechanism receives the notification. The delivery mechanism also may acknowledge receipt of the notification only after the user has accessed the notification, or otherwise indicated recognition of the notification, within, for example, a predetermined period of time (e.g., an "idle time" threshold period). If the delivery mechanism fails to confirm receipt of the notification, the notification delivery service 352 may perform a redelivery process (step 960). The redelivery process may include, for example, redelivery to the delivery mechanism that failed to confirm receipt. That redelivery may continue until a confirmation is received or a predetermined failure threshold is reached. The redelivery process also may include selection of and delivery to another delivery mechanism associated with the user (e.g., delivery to a pager or to email rather than to a preferred mobile phone). Redelivery in this manner may be selected, for example, based on a failure to receive a confirmation indicating that the user has accessed or recognized the notification within the "idle time" threshold period. The delivery process may continue until a delivery mechanism to which delivery of the notification is made confirms that the notification is received. Once a delivery mechanism confirms that the notification is received, the notification delivery process may conclude (step 965).

Figure 10:
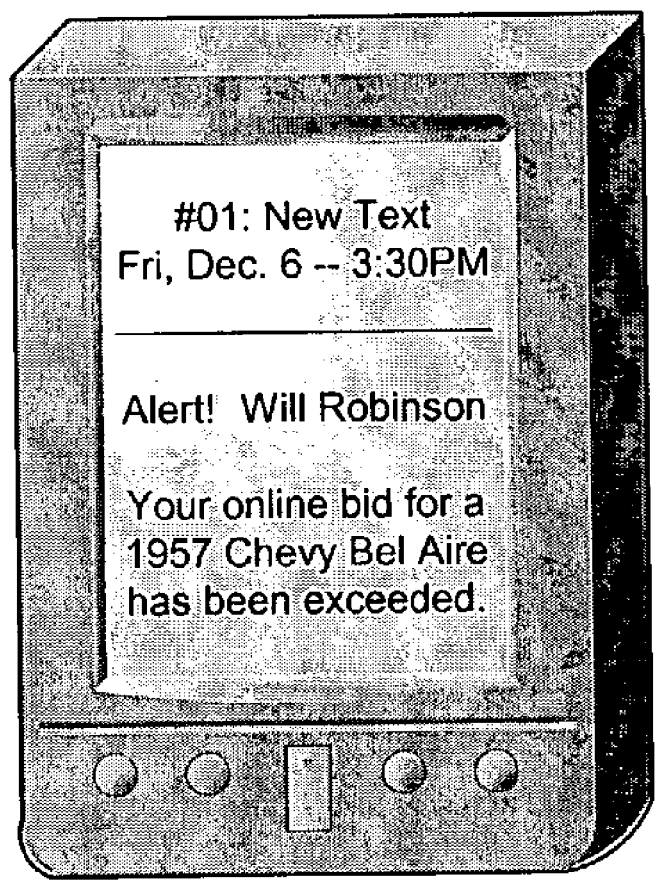
FIG. 10 illustrates an exemplary notification delivered to a user at a mobile device.

FIG. 10 illustrates an auction alert that may be delivered to a PDA or mobile phone of a user. The auction alert may be any type of instant message, pop-up window, icon, and or audible or tactile alarm capable of gaining the attention of the user. The auction alert may provide information such as an alert identifier, identification of the auction item, the reason for the notification, and a date and time stamp of when the auction alert was received. The PDA or mobile phone also notifies the user "Alert! WillRobinson. Your online bid for a 1957 Chevy Bel Aire has been exceeded." In another aspect, the auction alert may include an edit button for editing the presentation of the alert, and a respond/more information button for accessing the auction using the online service to update the bid and/or to obtain more detailed information regarding the auction.

Other implementations are within the scope of the following claims.

What is claimed is:

1. A notification system that delivers an electronic notification to an intended recipient, the system comprising:
   a communication module configured to communicate a machine-generated first electronic notification directed to an intended recipient and a machine-generated second electronic notification directed to the intended recipient, the first electronic notification being configured to inform the intended recipient of occurrence of a first type of event and a first subject matter associated with a first particular instance of the first type of event, and the second electronic notification being configured to inform the intended recipient of occurrence of the first type of event and a second subject matter associated with a second particular instance of the first type of event, the second subject matter being different than the first subject matter and the second particular instance being different than the first particular instance;

a presence module configured to determine presence information associated with the intended recipient before attempting to deliver the first notification and the second notification to the intended recipient;

a selection module configured to:
  select, based on the presence information and the first subject matter, a first delivery mechanism from among several delivery mechanisms potentially available for the intended recipient, and
  select, based on the presence information and the second subject matter, a second delivery mechanism from among several delivery mechanisms potentially available for the intended recipient, the second delivery mechanism being different than the first delivery mechanism; and a delivery module configured to:
  deliver the first electronic notification to the intended recipient at the selected first delivery mechanism, and
  deliver the second electronic notification to the intended recipient at the selected second delivery mechanism.

2. The system of claim 1 wherein the presence information includes information related to online presence of the intended recipient at a time at which the selection module is preparing to select the first delivery mechanism from among the several delivery mechanisms potentially available to the intended recipient.

3. The system of claim 2 wherein the information related to the online presence of the intended recipient includes information indicating that the intended recipient is logged onto an online service at a time at which the selection module is preparing to select the first delivery mechanism from among the several delivery mechanisms potentially available to the intended recipient.

4. The system of claim 2 wherein the information related to the online presence of the intended recipient includes information indicating that the intended recipient is connected to an online service at a time at which the selection module is preparing to select the first delivery mechanism from among the several delivery mechanisms potentially available to the intended recipient.

5. The system of claim 2 wherein the information related to the current online presence of the intended recipient includes information indicating a delivery mechanism associated with the online presence of the intended recipient at a time at which the selection module is preparing to select the first delivery mechanism from among the several delivery mechanisms potentially available to the intended recipient.

6. The system of claim 1 wherein the presence information includes information indicating that the intended recipient physically is present within a predefined range of one or more of the delivery mechanisms potentially available to the intended recipient at a time at which the selection module is preparing to select the first delivery mechanism from among the several delivery mechanisms potentially available to the intended recipient.

7. The system of claim 1 further comprising a cascaded instruction module configured to select a cascaded delivery instruction that is appropriate for the intended recipient based on notification information.

8. The system of claim 7 wherein the cascaded delivery instruction lists several delivery mechanisms, and wherein the selection module is further configured to use the presence information to select a delivery mechanism from within the cascaded delivery instruction that appears available to provide the first electronic notification to the user without significant delay.

9. The system of claim 8 wherein at least one of the several delivery mechanisms potentially available for the intended recipient is a mobile client, and wherein the mobile client is selected as the first delivery mechanism based on the cascaded delivery instruction.

10. The system of claim 8 wherein the notification information comprises information related to a preference of the intended recipient.

11. The system of claim 10 wherein the preference of the intended recipient comprises a preferred first delivery mechanism.

12. The system of claim 11 wherein at least one of the several delivery mechanisms potentially available for the intended recipient is a mobile client, and the preferred first delivery mechanism comprises the mobile client.

13. The system of claim 10 wherein the preference of the intended recipient comprises a preferred delivery precedence.

14. The system of claim 10 wherein the preference of the intended recipient comprises information describing a quiet time.

15. The system of claim 10 wherein the preference of the intended recipient comprises a preferred priority of the first electronic notification.

16. The method of claim 1, wherein the first type of event comprises a stock alert.

17. The method of claim 16, wherein the first subject matter comprises a change in value of a first particular stock and the second subject matter comprises a change in value of a second particular stock that is different than the first particular stock.

18. The method of claim 1, wherein the first type of event comprises an auction alert.

19. The method of claim 18, wherein the first subject matter comprises a change in value of a bid on an item in a first particular auction and the second subject matter comprises a change in value of a bid on an item in a second particular auction that is different than the first particular auction.

20. The method of claim 1, wherein the first type of event comprises a birthday reminder or an anniversary reminder.

21. The method of claim 20, wherein the first subject matter comprises a notice that a birthday or an anniversary of a first particular person is upcoming and the second subject matter comprises a notice that a birthday or an anniversary of a second particular person is upcoming.

22. A system for selecting a mechanism to be used for delivering an electronic communication, the system comprising:
  a determination module configured to determine actual availability of an intended recipient presently to receive a machine-generated first electronic communication using a first candidate delivery mechanism and determine actual availability of the intended recipient to receive a machine-generated second electronic communication using a second candidate delivery mechanism different from the first candidate delivery mechanism, the determination occurring before attempting to deliver the first electronic communication using the first candidate delivery mechanism and before attempting to deliver the second electronic communication using the second candidate delivery mechanism, the first electronic communication being configured to inform the intended recipient of occurrence of a first type of event and a first subject matter associated with a first particular instance of the first type of event, and the second electronic communication being configured to inform the intended recipient of occurrence of the first type of event and a second subject matter associated with a second particular instance of the first type of event, the second subject matter being different than the first subject matter and the second particular instance being different than the first particular instance; and a decision module configured to:

decide whether to send the first electronic communication using the first candidate delivery mechanism based on the first subject matter, and the actual availability determined for receiving the first electronic communication, and decide whether to send the second electronic communication using the second candidate delivery mechanism based on the second subject matter, and the actual availability determined for receiving the second electronic communication.

23. The system of claim 22 wherein the determination module is configured further to determine the actual availability of the intended recipient to receive the first electronic notification based on an activity of the intended recipient.

24. The system of claim 22 wherein the determination module is configured further to determine the actual availability of the intended recipient to receive the first electronic notification based on a behavior of the intended recipient.

25. The system of claim 22 wherein the determination module is configured further to determine the actual availability of the intended recipient to receive the first electronic notification based on a physical presence of the intended recipient.

26. The system of claim 22 wherein the determination module is configured further to determine the actual availability of the intended recipient to receive the first electronic notification based on an online presence of the intended recipient.

27. A computer-implemented method of delivering an electronic notification to an intended recipient, the method comprising:

configuring a communication module to communicate a machine-generated first electronic notification directed to an intended recipient and a machine-generated second electronic notification directed to the intended recipient, the first electronic notification being configured to inform the intended recipient of occurrence of a first type of event and a first subject matter associated with a first particular instance of the first type of event, and the second electronic notification being configured to inform the intended recipient of occurrence of the first type of event and a second subject matter associated with a second particular instance of the first type of event, the second subject matter being different than the first subject matter and the second particular instance being different than the first particular instance;

configuring a presence module to determine presence information associated with the intended recipient before attempting to deliver the first notification and the second notification to the intended recipient;

configuring a selection module to:

select a first delivery mechanism from among several delivery mechanisms potentially available for the intended recipient based on the presence information and the first subject matter and select a second delivery mechanism different from the first delivery mechanism from among several delivery mechanisms potentially available for the intended recipient based on presence information and the second subject matter; and configuring a delivery module to:

deliver the first electronic notification to the intended recipient at the selected first delivery mechanism, and deliver the second electronic notification to the intended recipient at the selected second delivery mechanism.

28. The method of claim 27 wherein determining the presence information includes determining information related to online presence of the intended recipient when preparing to select the first delivery mechanism from among the several delivery mechanisms potentially available to the intended recipient.

29. The method of claim 28 wherein determining the information related to the online presence of the intended recipient includes determining information indicating that the intended recipient is logged onto an online service when preparing to select the first delivery mechanism from among the several delivery mechanisms potentially available to the intended recipient.

30. The method of claim 28 wherein determining the information related to the online presence of the intended recipient includes determining information indicating that the intended recipient is connected to an online service when preparing to select the first delivery mechanism from among the several delivery mechanisms potentially available to the intended recipient.

31. The method of claim 29 wherein determining the information related to the online presence of the intended recipient includes determining information indicating a delivery mechanism associated with the online presence of the intended recipient when preparing to select the first delivery mechanism from among the several delivery mechanisms potentially available to the intended recipient.

32. The method of claim 27 wherein determining the presence information includes determining information indicating that the intended recipient physically is present within a predefined range of one or more of the delivery mechanisms potentially available to the intended recipient when preparing to select the first delivery mechanism from among the several delivery mechanisms potentially available to the intended recipient.

33. The method of claim 27 further comprising configuring a cascaded instruction module to resolve a cascaded delivery instruction that is appropriate for the intended recipient based on notification information.

34. The method of claim 33 wherein configuring the selection module to deliver the electronic notification further comprises configuring the selection module to resolve the cascaded delivery instruction to include several delivery mechanisms and to use the presence information to select a delivery mechanism from within the cascaded delivery instruction that appears available to provide the first electronic notification to the user without significant delay.

35. The method of claim 34 wherein at least one of the delivery mechanisms potentially available for the intended recipient is a mobile client, and wherein the mobile client is selected as the first delivery mechanism based on the cascaded delivery instruction.

36. The method of claim 34 wherein the notification information comprises information related to a preference of the intended recipient.

37. The method of claim 36 wherein the preference of the intended recipient comprises a preferred first delivery mechanism.

38. The method of claim 37 wherein at least one of the several delivery mechanisms potentially available for the intended recipient is a mobile client, and the preferred first delivery mechanism comprises the mobile client.

39. The method of claim 36 wherein the preference of the intended recipient comprises a preferred delivery precedence.

40. A computer program stored on a computer readable medium for delivering an electronic notification to an intended recipient, the computer program comprising:

a notification delivery code segment that causes a computer to:

receive a machine-generated first electronic notification directed to an intended recipient and a machine-generated second electronic notification directed to the intended recipient, the first electronic notification being configured to inform the intended recipient of occurrence of a first type of event and a first subject matter associated with a first particular instance of the first type of event, and the second electronic notification being configured to inform the intended recipient of occurrence of the first type of event and a second subject matter associated with a second particular instance of the first type of event, the second subject matter being different than the first subject matter and the second particular instance being different than the first particular instance;

determine presence information associated with the intended recipient before attempting to deliver the first notification and the second notification to the intended recipient, deliver the first electronic notification to the intended recipient, at a first delivery mechanism associated with the intended recipient, based on the presence information and the first subject matter, and deliver the second electronic notification to the intended recipient, at a second delivery mechanism associated with the intended recipient that is different than the first delivery mechanism, based on the presence information and the second subject matter; and an access service code segment that causes the computer to enable communication between the notification delivery code segment and the intended recipient to yield a distinct access revenue.

41. A computer-implemented method for selecting a mechanism to be used for delivering an electronic communication, the method comprising:

determining actual availability of an intended recipient presently to receive a machine-generated first electronic communication using a first candidate delivery mechanism and determining actual availability of the intended recipient to receive a machine-generated second electronic notification using a second candidate delivery mechanism different from the first candidate delivery mechanism, the determination occurring before attempting to deliver the first electronic communication using the first candidate delivery mechanism and before attempting to deliver the second electronic communication using the second candidate delivery mechanism, the first electronic communication being configured to inform the intended recipient of occurrence of a first type of event and a first subject matter associated with a first particular instance of the first type of event, and the second electronic communication being configured to inform the intended recipient of occurrence of the first type of event and a second subject matter associated with a second particular instance of the first type of event, the second subject matter being different than the first subject matter and the second particular instance being different than the first particular instance;

deciding whether to send the first electronic communication using the first candidate delivery mechanism based on the first subject matter and the actual availability determined for receiving the first electronic communication, and deciding whether to send the second electronic communication using the second candidate delivery mechanism based on the second subject matter and the actual availability determined for receiving the second electronic communication.

42. The method of claim 41 wherein determining the actual availability of the intended recipient comprises determining an availability of the intended recipient based on an activity of the intended recipient.

43. The method of claim 41 wherein determining the actual availability of the intended recipient comprises determining an availability of the intended recipient based on a behavior of the intended recipient.

44. The method of claim 41 wherein determining the actual availability of the intended recipient comprises determining an availability of the intended recipient based on a physical presence of the intended recipient.

45. The method of claim 41 wherein determining the actual availability of the intended recipient comprises determining an availability of the intended recipient based on an online presence of the intended recipient.

46. A computer-implemented method for delivering an electronic notification to an intended recipient, the method comprising:

receiving an electronic notification that is assigned a message priority level and that is directed to an intended recipient;

determining presence information associated with the intended recipient before attempting to deliver the notification to the intended recipient;

determining a first time interval corresponding to an interval of time during which the intended recipient chooses to receive electronic notifications over a delivery mechanism without regard to the message priority level;

determining a second time interval related to the intended recipient that is different than the first time interval, the second time interval corresponding to an interval of time during which the intended recipient chooses to not receive electronic notifications over the delivery mechanism unless the message priority level assigned to the electronic notifications is higher than a first predetermined threshold; and determining whether to deliver the electronic notification over the delivery mechanism to the intended recipient based on the presence information, the first time interval, the second time interval, and the message priority level of the electronic notification.

47. The method of claim 46 wherein the message priority level is selected from a group consisting of urgent priority and normal priority.

48. The method of claim 47 wherein determining whether to deliver the electronic notification to the intended recipient comprises determining to not deliver the electronic notification if the message priority level is normal priority and the time of delivery falls within the second time interval.

49. The method of claim 47 wherein determining whether to deliver the electronic notification to the intended recipient comprises determining to deliver the electronic notification if the message priority level is urgent priority and the time of delivery falls within the second time interval.

50. The method of claim 46 further comprising configuring a selection module to select among several delivery mechanisms potentially available for the intended recipient based on the presence information and a subject matter communicated by the electronic notification.

51. The method of claim 46 wherein the second time interval comprises a quiet time interval.

52. The method of claim 46, wherein the second time interval is specified by the intended recipient.

53. The method of claim 46, wherein the first time interval is a first interval of time within a day and the second time interval is a second interval of time within the same day.

54. The method of claim 46, wherein determining whether to deliver the electronic notification over the delivery mechanism to the intended recipient includes:
determining a proposed time of delivery of the electronic notification;
comparing the proposed time of delivery to the first time interval and the second time interval;
comparing the message priority level to the first predetermined threshold;
conditioned on the proposed time of delivery being within the first time interval, delivering the electronic notification to the delivery mechanism at the proposed time of delivery; and
conditioned on the proposed time of delivery being within the second time interval,
delivering the electronic notification to the delivery mechanism at the proposed time of delivery conditioned on the message priority level being higher than the first predetermined threshold, and
not delivering the electronic notification to the delivery mechanism at the proposed time of delivery conditioned on the message priority level not being higher than the first predetermined threshold.

55. A notification system that delivers an electronic notification to an intended recipient, the system comprising:
a communication module configured to commumeate a machine-generated first electronic notification directed to an intended recipient and a machine-generated second electronic notification directed to the intended recipient, the first electronic notification being configured to inform the intended recipient of occurrence of a first class of event and a first subject matter associated with a first particular instance of the first class of event, and the second electronic notification being configured to inform the intended recipient of occurrence of the first class of event and a second subject matter associated with a second particular instance of the first class of event, the second subject matter being different than the first subject matter and the second particular instance being different than the first particular instance;
a presence module configured to determine presence information associated with the intended recipient before attempting to deliver the first notification and the second notification to the intended recipient;
a selection module configured to:
select, based on the presence information and the first subject matter, a first delivery mechanism from among several delivery mechanisms potentially available for the intended recipient, and
select, based on the presence information and the second subject matter, a second delivery mechanism from among several delivery mechanisms potentially available for the intended recipient, the second delivery mechanism being different than the first delivery mechanism; and
a delivery module configured to:
deliver the first electronic notification to the intended recipient at the selected first delivery mechanism, and
deliver the second electronic notification to the intended recipient at the selected second delivery mechanism.

56. The method of claim 55 wherein the first class of event comprises an alert and the first subject matter comprises stock.

57. The method of claim 56 wherein the second subject matter comprises weather or an auction.

58. The method of claim 55 wherein the first class of event comprises an alert and the first subject matter comprises weather or an auction.

59. The method of claim 55 wherein the first class of event comprises a reminder and the first subject matter compnses an anniversary.

60. The method of claim 59 wherein the second subject matter comprises a birthday.

61. The method of claim 55 wherein the first class of event comprises a reminder and the first subject matter comprises a birthday.

* * * * *